(12) United States Patent
Ferlitsch et al.

(10) Patent No.: US 7,492,473 B2
(45) Date of Patent: Feb. 17, 2009

(54) METHOD AND SYSTEM FOR INSTANT FAX TRANSMISSION

(75) Inventors: Andy Rodney Ferlitsch, Tigard, OR (US); Kevin James Baker, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 359 days.

(21) Appl. No.: 11/379,868

(22) Filed: Apr. 24, 2006

(65) Prior Publication Data

US 2006/0209342 A1   Sep. 21, 2006

Related U.S. Application Data

(63) Continuation of application No. 09/761,447, filed on Jan. 16, 2001, now abandoned.

(51) Int. Cl.
  *G06F 3/12* (2006.01)
(52) U.S. Cl. ............... 358/1.15; 358/402; 358/442; 379/93.24

(58) Field of Classification Search ............... 358/1.15, 358/402, 442; 379/93.24, 93.14, 90.01
See application file for complete search history.

(56) References Cited

U.S. PATENT DOCUMENTS

| 5,790,639 | A  | * | 8/1998 | Ranalli et al. | 379/100.08 |
| 6,208,426 | B1 | * | 3/2001 | Saito et al. | 358/1.15 |
| 6,501,834 | B1 | * | 12/2002 | Milewski et al. | 379/93.24 |

* cited by examiner

*Primary Examiner*—Kimberly A Williams
(74) *Attorney, Agent, or Firm*—Krieger Intellectual Property, Inc.; Scott C. Krieger

(57) ABSTRACT

A method of providing computer users with fax services. A user activates a fax system on the user's computer. The fax system then activates a fax service by establishing communication with the fax service across a network and transmitting information about the user to the fax service. The fax system then uses the fax service to participate in any fax transactions as desired by the user. When the system is deactivated, communication between the fax system and the fax service is terminated.

20 Claims, 3 Drawing Sheets

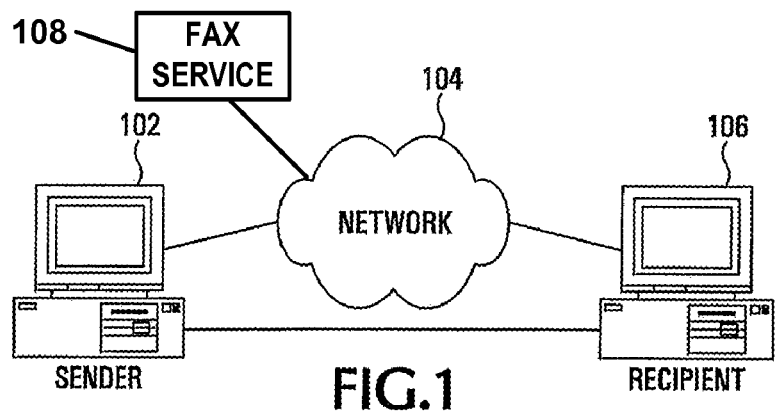
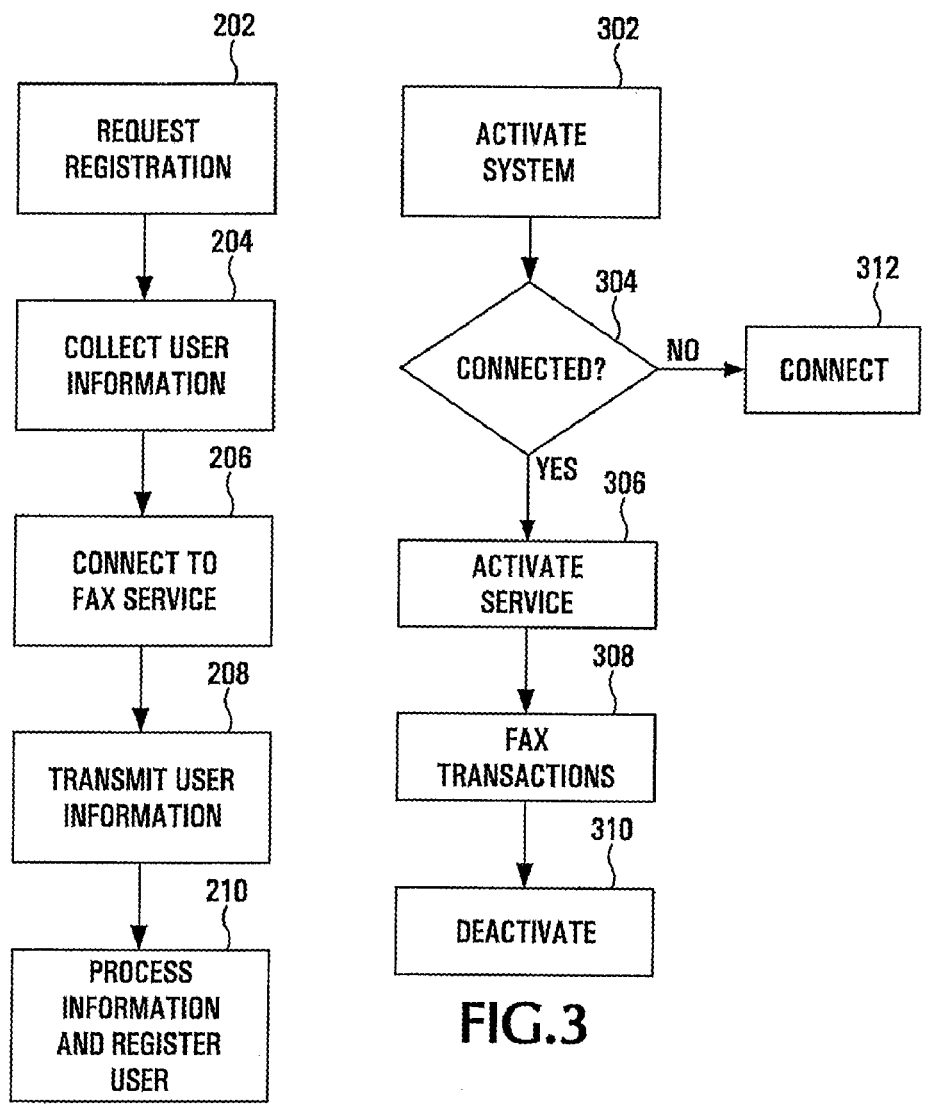

METHOD AND SYSTEM FOR INSTANT FAX TRANSMISSION

RELATED REFERENCES

This application is a continuation of U.S. patent application Ser. No. 09/761,447, entitled "Method and System for Instant Fax Transmission" filed on Jan. 16, 2001 now abandoned.

FIELD OF THE INVENTION

This disclosure relates to methods and systems for real-time fax transmission across a network, more particularly to one that provides a central fax registration service, using an existing network and public switched telephone network infrastructure.

BACKGROUND

Several options exist that allow users to send faxes beyond the traditional direct connection between two fax machines across the public switched telephone network (PSTN). One such method is an e-mail fax. Some service providers allow users to send faxes to recipient's e-mail addresses as attachments. Typically, recipients in these types of service must be registered users of the service.

An alternative method of email fax is to map fax numbers to recipient's e-mail addresses. When that number is dialed, the system determines to what e-mail address that number has been mapped and then e-mails the images to the appropriate address. In this type of system, each sender must have an address book installed on the sending system and the recipient must reside at a known e-mail address listed in the book.

Another option for non-traditional fax transmission is fax forwarding. In fax forwarding, a message from the sender is moved across the Internet and to the recipient's area code. This service requires that the fax forwarding service have a switch in the recipient's PSTN area code. A drawback is that the faxes are not real-time.

Fax pirating involves bundling fax messages and then storing them. The faxes are sent during off-peak times. This option does not allow real-time transmission, but can be helpful in countries where there are limited phone resources.

An emerging area that offers non-traditional fax transmission is Internet ready telephones. These may be known as Web phones. Two different options serve as examples of possibilities that exist with these phones. In a first example, each telephone switch in the PSTN would have a hypertext transmission protocol (http) server and a fixed Internet Protocol (IP) address. When an incoming phone call comes in that is directed to an area code outside the caller's area code, the server looks up the fixed IP address of the switch in the call recipient's area code. The system would then establish a virtual circuit between the two switches over the Internet. At the call recipient's end, the switch would then rout the call to the caller over the PSTN in the local area code. An example of this method is shown in U.S. Pat. No. 6,069,890.

Another option using Web phones or their equivalent is to have the server in the telephone device. Each device would then have a fixed IP address. The two phones connect through the PSTN, exchange the necessary information to establish a network connection and then reconnect through the Internet.

As can be seen by the discussion above, the current state of the art does not provide a method to provide real-time faxes across the network, except as e-mail attachments, without providing fixed IP addresses. Fixed IP addresses are difficult to manage and require extra connection protocols, since most connections are done with dynamic IP address assignments. In addition, these approaches waste IP address protocols, as some of the fixed addresses may be assigned to devices that become inactive, but there is no method to reassign the address.

SUMMARY

One aspect of the disclosure is a method for providing a fax system to users. The fax system resides on a user's device, such as a personal computer, fax machine, PDA or a Web phone. The fax system allows a user to access a central fax service but then provides the user with the capability to send and receive faxes when connected to the service. The user registers with the service and the system stores the user information, including such items as the user's fax number, e-mail address, preferences for receiving faxes when the user is not active, and the dynamic network address of the user for that session. Faxes may be sent in a peer-to-peer fashion or in a peer-service-peer fashion.

Another aspect of the disclosure is a method for allowing users to issue send commands to the fax system. The fax system would collect the recipient information and determining whether the recipient is registered. If the recipient is not registered, the service employs alternative methods to contact the recipient. If the recipient is registered, the service checks to determine whether the recipient is active. If the recipient is active the fax is sent. If the recipient is not active, the service determines the recipient's preferred method to receive faxes when not active.

BRIEF DESCRIPTION OF THE DRAWINGS

The invention may be best understood by reading the disclosure with reference to the drawings, wherein:

FIG. 1 shows one embodiment of a fax system, in accordance with the invention;

FIG. 2 shows a flowchart of one embodiment of a method for registering users with a fax service, in accordance with the invention.

FIG. 3 shows a flowchart of one embodiment of a method for connecting a registered user to a fax service, in accordance with the invention.

DETAILED DESCRIPTION OF THE EMBODIMENTS

Figure 4:
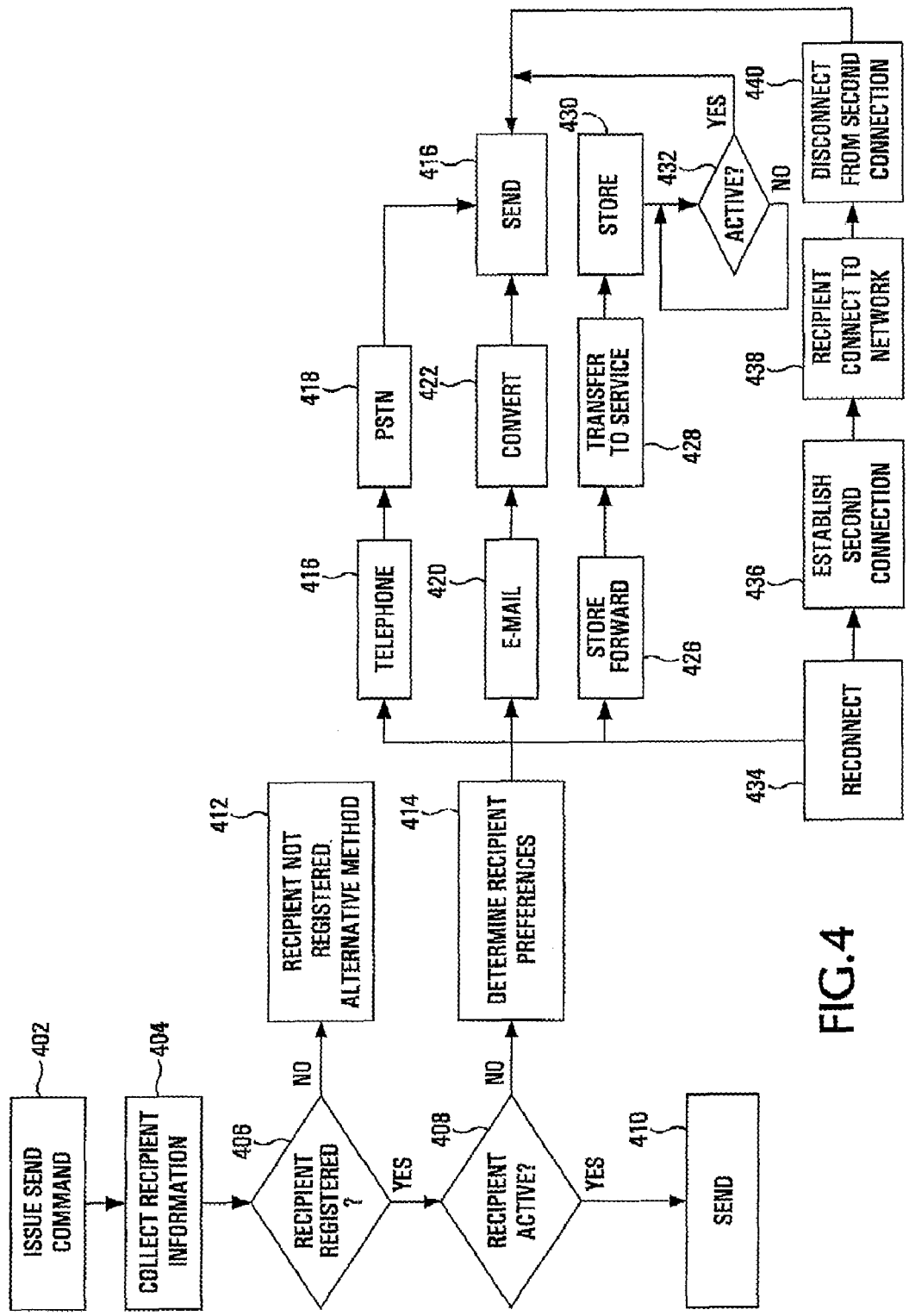
FIG. 4 shows a flowchart of one embodiment of a method to receive a fax from a fax service, in accordance with the invention.

The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the system and apparatus of the present invention, as represented in FIGS. 1 through 6 is not intended to limit the scope of the invention, as claimed, but it is merely representative of the presently preferred embodiments of the invention.

The currently preferred embodiments of the present invention will be best understood by reference to the drawings, wherein like part are designated by like numerals throughout.

FIG. 1 shows an example of a system for sending and receiving faxes across a network. The sender has a device 102 that has access to the network 104. The recipient also has a device 106 with access to the network 104. Access could be accomplished through local Internet Service Provider (ISP) or other network provider, local area network (LAN), or wide area network (WAN), as examples. The devices could be personal computers with modems of Ethernet cards, fax machines, web telephone or a wireless device, such as a hand-held personal digital assistant (PDA).

In addition to access to the network, these devices 102 and 106 have the capability to set up a peer-to-peer connection in one embodiment of the invention. A fax system resides on each device and a fax service 108 resides on the network 104, to which each fax system can connect. The fax systems interact with the fax service to set up and manage the peer-to-peer connection between the sender and the recipient.

In order to utilize the fax service, the user must initially register with the service. This is shown in FIG. 2. In one example, the user activates the fax system for the first time on a device, more than likely at installation of the fax system. At 202 the user either requests registration or the fax system on the user's device automatically requests registration with the fax service.

At 204, the fax system collects the necessary user information. This may include the user's name, e-mail address, fax number, phone number and will include the user's current dynamic network address for that session. Other information or any combination of the above may also be gathered, the above items are only intended as examples. As will be discussed further, the fax service may offer the user the option of designating alternative methods of receiving faxes when the user is not actively connected to the service when another registered user of the fax service desires to send the user a fax. At 206, the fax system connects to the fax service. If the user is already connected to the network upon which the fax services resides, the fax system just accesses a pre-defined network address. If the network is the Internet, the pre-defined address will be a domain name, or uniform resource locator (URL), and the dynamic network address of the user for that session will be the IP address.

The network could be any type of network, including LANs, WANs, proprietary networks or the Internet. However, since application of the invention is easier to understand in the context of one network, use of the Internet will be assumed. However, this is for ease of discussion and is in no way intended to limit application of the invention.

In the case where the user is not already connected to the network, the fax system will request connection to the network. This may be done by a network connection, such as an Internet connection, internal to the fax system, or may be done by locating and activating the network software on the user's device, or initiated by the user via an Internet browser or other network connection device. Once connected to the network, the fax system would then connect to the fax service.

One connected to the fax service, the user information previously collected is transmitted to the fax service at 208. This information is processed by parsing out the necessary information and entering it into some type of indexed storage, such as a database. Entering all of the user's information into the storage completes the initial registration of the user. It must be noted that each subsequent time the user connects to the fax service, the user information will be updated. At a minimum, the user's dynamic network address for the current session will be updated. This also provides the user to change the fax number and current preferences for receiving faxes if inactive.

Once registered with the fax service, the user is free to establish a session to access the service whenever faxes need to be sent or received. An example of a general session interaction is shown in FIG. 3. At 302 the fax system is activated. The user may cause the interaction by accessing the fax system directly; of the fax system may activate itself. For example, if the user is working in a word processing or other document creation software and desires to send a fax, the fax system activates the fax system across the network at 306. As mentioned above, activation of the fax system will include updating the user information as needed, including the current network address for this particular system. After the service is activated, the user can participate in fax transaction as necessary, including sending faxes, receiving faxes or just waiting for faxes.

When the user concludes any fax transaction, the user can deactivate the fax system at 310. Deactivation will terminate the connection between the fax service and the fax system, whether the user remains connected to the network. Termination can only be by user request to the fax system, set up to terminate automatically after the conclusion of a transaction, or whenever the user logs off the network. These are just examples, with the first two allowing the user to remain connected to the network if desired, and the last allowing automatic deactivation of the service upon disconnection from the network.

Several specific examples may occur within the general example of FIG. 3. For example, the fax transaction of 308 of FIG. 3 may be a user sending a fax as shown in FIG. 4. In this example, FIG. 4 is an expansion of the transaction of FIG. 3. Prior to this particular transaction, the user has already activated the fax system on the user's device, connected to the fax service if necessary and activated the service by sending the updated user information to the service.

The user issues a send command at 402. As mentioned above, the user may do this directly with the fax system, locally, remotely, or by whatever means necessary to issue the command, or within a document creation software application. As part of the send command the user, now referred to as the sender, will identify the recipient of the fax. The fax system will collect the necessary recipient information, including the recipient's name, fax number, phone number, e-mail address, as possible examples. As one example, the sender may know that the recipient is also a registered fax service user and may only need to send the recipient's name. In another example, the sender may not known if the recipient is registered or not. This will be assumed for the following discussion.

Once the user has identified the recipient and collected whatever information is necessary, the fax service determines whether or not the recipient is registered with the fax service. If the recipient is registered at 406, the fax service then determines whether or not the recipient is active at 408. If the user is registered and active, the fax service sends the fax at 410. As will be discussed further with regard to FIG. 6, a peer-service-peer connection may exist. In the example of FIG. 1, the system may return the dynamic network address of the recipient to the sender fax system. This then allows the sender fax system to establish a peer-to-peer connection with the recipient and send the fax.

If the recipient is not registered at 406, an alternative method of sending the fax will have to be determined. Several embodiments of alternative methods will be discussed further with reference to FIG. 5. If the recipient is registered at 406, but not active at 404, the fax service will retrieve the recipient's preferences for receiving faxes when not active. Some examples of these options are shown in FIG. 4.

If the recipient's preference is to receive faxes by standard telephone fax transmission when inactive at 416, the fax service will dial out of network to the PSTN at 418. The fax will then be sent from the sender through the network to the fax service to the recipient through PSTN. The fax will be sent at 424.

If the recipient's preferences is to retrieve the fax through e-mail at 420, the fax service will convert it to an email attachment format at 422. The type of email attachment generated such as a *.TIFF file, a *.PDF file, or other type attachable image file may also be designated by the user in the user preference file generated when the user registers. The e-mail attachment is then sent at 424.

If the recipient's preference is to have the fax stored forward at 426, the contents of the fax will be transferred to the service at 428 for storage. The service will then store the fax at 420 and hold it until the user becomes active at 432. When the user becomes active at 432, the fax is forwarded to them at 424.

If the recipient's preference is to reconnect when there are other users trying to send faxes, the fax service establishes a second connection through the PSTN at 436 by dialing a number designated by the recipient. Once the second connection is established, a message is sent directing the recipient to connect to the network at 438. Once the recipient is reconnected to the network, the second connection is disconnected at 440. Finally, the fax is sent at 424.

Figure 5:
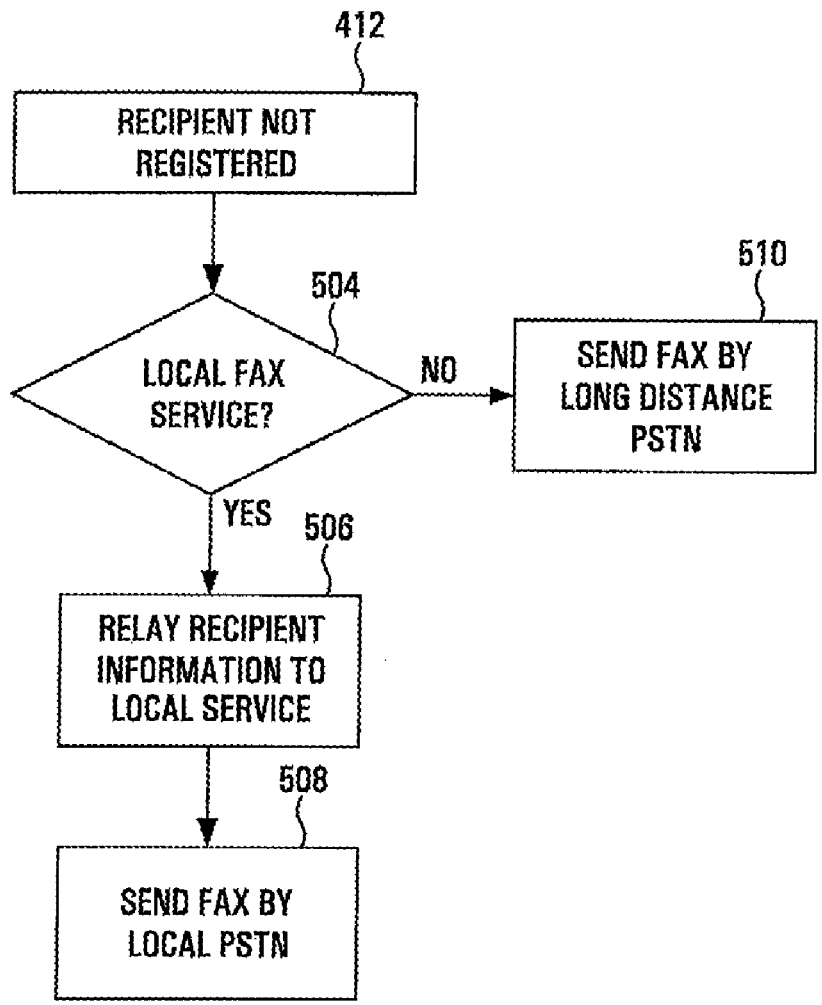
FIG. 5 shows a flowchart of one embodiment of a method to receive a fax from a fax service where the recipient is not registered with the service, in accordance with invention.

All of these options are merely examples of methods of sending faxes to a registered user that is not currently connected to the fax service. No intention of limiting the invention is intended by any of these examples. FIG. 5 shows an example of a method to send a fax by alternative methods to recipients not registered with the fax service. As determined in FIG. 4, the recipient is not registered 412.

In order to save toil charges, the fax service will determine if it has a service in the same area code as the recipient's fax number provided by the sender. If a local server or other relay for the fax service exists, the recipient information is relayed to the local service at 506 across the network. The fax service then dials out of the network establishing connection with the recipient's fax device and the fax is sent through the local PSTN at 508. If there is no local fax service to the recipient's area code, the fax is sent by long distance PSTN at 510. As an added feature, the service may bundle several faxes and transmit them whenever a long distance connection is established to save toll charges.

In each of the above examples, a peer-to-peer connection between the recipient's receiving device and the sender's fax system is assumed, except in the store forward option of FIG. 4. The recipient's receiving device, whether it be e-mail, phone or thorough the fax service, is notified and a connection established between the sender and the recipient. An alternative option is shown in FIG. 6.

Figure 6:
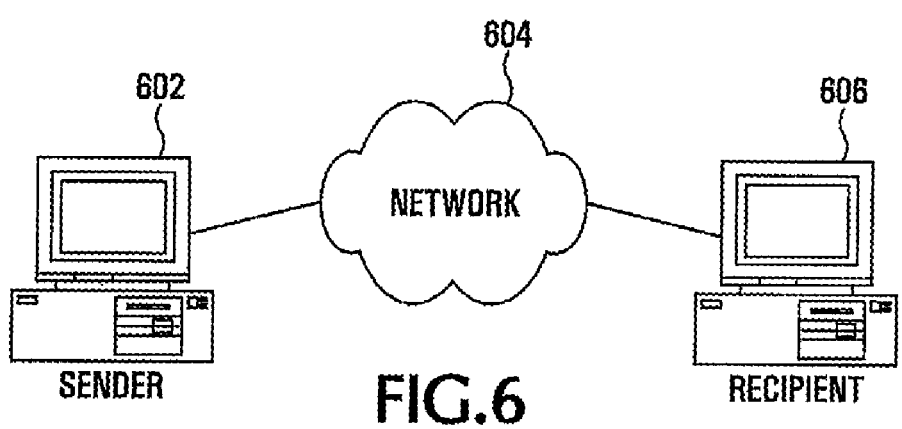
FIG. 6 shows an alternative embodiment of a fax service system, in accordance with the invention.

In FIG. 6, the sender 602 and the recipient 606 are connected through the fax service on the network 604. In this case, the connection is not peer-to-peer, but only peer-service-peer. Faxes sent through the fax service may or may not be sent in real time, depending upon the service load, recipient status and other considerations. Transmission from peer-service-peer is real time. One reason for the peer-service-peer connection is for security to not disclose the physical location of the sender/recipient that could be derived from the IP address.

In all of the above examples, no special equipment is needed, but can be used if desired. A personal computer with a modem can have installed on it software that has the necessary instructions to create fax system and connect to the fax system over a network, such as the Internet. In this case, the method of the invention will be embodied as software instructions on some sort of computer readable medium that will implement all of the necessary steps of the method. Alternatively, the fax device could be a fax machine with the necessary software installed in it, or a web phone.

Thus, although there has been described to this point a particular embodiment for a method and apparatus for transmission of faxes across a network, it is not intended that such specific references be considered as limitations upon the scope of this invention except insofar as set forth in the following claims.

We claim:

1. A method for transmission of a facsimile message with alternative delivery options, said method comprising:

receiving a converted facsimile message that has been converted from a Public Switched Telephone Network (PSTN) format to a packet-based network (PBN) format;

determining the recipient of said converted message;

determining an activity status of said recipient;

checking recipient delivery options designated by said recipient;

sending said converted message to a recipient-proximate site over said packet-based network, reconverting said converted message back to a PSTN format and delivering said reconverted message to said recipient over a PSTN network extending between said recipient and said recipient-proximate site when said recipient is active; and sending said converted message to said recipient using an alternative address and alternative delivery method defined in said recipient delivery options when said recipient is not active.

2. The method of claim 1 wherein said converted facsimile message has been converted with a Hyper-Text Transfer Protocol (HTTP) server.

3. The method of claim 1 wherein said recipient-proximate site is in the same telephone area code as the recipient.

4. The method of claim 1 wherein said alternative address is and e-mail address and said alternative delivery method is e-mail transmission.

5. The method of claim 1 wherein said alternative address and alternative delivery method comprise storing said converted facsimile message on a network resource until said recipient becomes active and sending said converted facsimile message to said recipient when said recipient becomes active.

6. The method of claim 1 wherein said alternative address and alternative delivery method comprise an alternative recipient phone number.

7. The method of claim 1 wherein said alternative address and said alternative delivery method comprise establishing a connection to said recipient, sending an activation message over said connection to activate said recipient and then sending said converted message to a recipient-proximate site over said packet-based network, reconverting said converted message back to a PSTN format and delivering said reconverted message to said recipient over a PSTN network extending between said recipient and said recipient-proximate site.

8. The method of claim 1 wherein said alternative address and said alternative delivery method comprise reconverting said converted message back to a PSTN format and delivering said reconverted message to said recipient over a PSTN network extending between said recipient and a location where said reconversion occurs.

9. A method for alternative transmission of a facsimile message based on recipient activity status, said method comprising:

receiving a facsimile message;
determining the recipient of said facsimile message;
determining an activity status of said recipient;
checking pre-determined recipient delivery options designated by said recipient;
sending said facsimile message to a recipient-proximate site over a non-PSTN network and delivering said message to said recipient over a PSTN network extending between said recipient and said recipient-proximate site when said recipient is active; and
sending said facsimile message to said recipient using an alternative delivery method defined in said recipient delivery options when said recipient is not active.

10. The method of claim 9 wherein said alternative delivery method comprises sending said facsimile message to said recipient over a PSTN network extending between said recipient and a location said receiving occurs.

11. The method of claim 9 wherein said alternative delivery method comprises establishing a connection to said recipient, sending an activation message over said connection to activate said recipient and then sending said facsimile message to a recipient-proximate site over said packet-based network, and delivering said reconvened message to said recipient over a PSTN network extending between said recipient and said recipient-proximate site.

12. The method of claim 9 wherein said alternative delivery method comprises an e-mail transmission.

13. The method of claim 9 wherein said alternative delivery method comprises storing said facsimile message on a network resource until said recipient becomes active and sending said facsimile message to said recipient when said recipient becomes active.

14. The method of claim 9 further comprising converting said facsimile message to a packet-based format after said receiving and converting said converted, packet-based message to a PSTN format after said sending over a non-PSTN network.

15. A system for alternative transmission of a facsimile message based on recipient activity status, said system comprising:

a receiver for receiving a facsimile message;
a recipient detector for determining the recipient of said facsimile message;
an activity detector for determining an activity status of said recipient;
a delivery option reader for checking pre-determined recipient delivery options designated by said recipient;
a non-PSTN sender for sending said facsimile message to a recipient-proximate site over a non-PSTN network;
a PSTN delivery mechanism for delivering said message to said recipient over a PSTN network extending between said recipient and said recipient-proximate site when said recipient is active; and
an alternative sender for sending said facsimile message to said recipient using an alternative delivery method defined in said recipient delivery options when said recipient is not active.

16. The system of claim 15 further comprising a converter for converting said facsimile message to a non-PSTN format.

17. The system of claim 15 further comprising a reconverter for converting said facsimile message from a non-PSTN format to a PSTN format.

18. The system of claim 15 wherein said alternative sender comprises an e-mail sender.

19. The system of claim 15 wherein said alternative sender comprises a store forward system.

20. The system of claim 15 wherein said alternative sender comprises a system for activating said recipient through a communication connection.

* * * * *